Patented Mar. 29, 1949

2,465,710

UNITED STATES PATENT OFFICE 2,465,710

SULFUR-SET FURFURYL ALCOHOL RESINS

John J. Clancy, Millis, Mass., assignor to Arthur D. Little, Inc., Cambridge, Mass., a corporation of Massachusetts No Drawing. Application February 23, 1944, Serial No. 523,573

4 Claims. (Cl. 260—45.5)

The present invention relates to sulfur-set resin-like solids which are furan derivatives, and in particular to a sulfur-set condensation-polymerization product of furfuryl alcohol.

Furfuryl alcohol contains such double bonds as permit it to condense and polymerize under the influence of an acidic catalyst and to various degrees to form a variety of resin-like products having higher molecular weight. It is ordinarily assumed that condensation-polymerization product of furfuryl alcohol is a mixture of different reaction products, and both linear chain-like reaction products and three-dimensional reaction products are postulated. Such resin-like reaction products are not readily attacked by hydrocarbons but are adversely affected by boiling water and by steam, and deteriorate more or less rapidly when subjected to the action thereof either with or without exposure to air.

According to the present invention such condensation-polymerization product of furfuryl alcohol substances, herein referred to as "resins," are modified and improved in certain respects, in particular with respect to being rendered highly resistant to hydrocarbons and to salt water while also being highly resistant to deterioration on long exposure to either boiling water or steam with and without exposure to air. Thus, new compounds become available which are excellent for coating many materials, and in particular ferrous metal and structures made of ferrous metal.

Used as a coating composition of the "baked-on" type, it provides an excellent partitioning means, not only to protect a surface carrying it from corrosion and attack, but to protect materials, such as liquids in tanks lined with the composition, from injury or contamination deriving from the surface so coated.

The term "condensation-polymerization product of furfuryl alcohol" is herein used to indicate the product of a suitably catalysed reaction of furfuryl alcohol with itself or with the resulting reaction products, involving condensation and polymerization, whether or not any sulfur present takes part in the reaction. The reaction can proceed to form insoluble infusible resins, as described by Trickey and Miner in U. S. Patent No. 1,665,235, but the present invention employs only such formed resins which are fusible, whereby they flow in a mold, or such resins which are soluble to an extent to form a solution which will flow in a mold, and which as fusible or dissolved material will readily react with the sulfur contained therewith.

It is a general object of the present invention to provide ultimately a sulfur-set resin of condensation-polymerization product of furfuryl alcohol.

It is a particular object of the invention to provide a sulfur-containing composition deriving from or containing furfuryl alcohol capable of being applied to a surface, of being baked thereon, and of thereby providing a sulfur-set resin.

It is also an object of the invention to provide condensation-polymerization product of furfuryl alcohol in a sulfur-setting composition.

Other and ancillary objects and advantages of the invention will become apparent from the following description and explanation of the invention given hereinafter to illustrate the nature of the invention and of the presently preferred methods of carrying out the invention, without in any way intending to limit the invention short of its scope as set forth in the appended claims.

The primary sulfur-setting material of the present invention has many similarities to rubber in the technology of vulcanization. It permits many similar practices, such as the functioning of an accelerator of vulcanization, a catalyst for vulcanization, solidification and insolubilizing by vulcanization, use of elemental sulfur, flow in a mold during vulcanization, use of carbon black to reduce such flow on a mold, compounding as a plastic mass on rolls, and numerous other features which are found to be in common.

To effect a distinction, and yet to suggest analogy, the comparable terms in rubber technology, which are: vulcanize, vulcanizing, vulcanized, vulcanisable and vulcanization, have their counterparts for the present invention, respectively, as: sulfur-set, sulfur-setting, sulfur-set, sulfur-setting, and sulfur-setting.

Furfuryl alcohol readily condenses and polymerizes under the influence of suitable promoting agents such as acidic material, of which boron fluoride ($BF_3$) is a well-known example. The resulting furfuryl alcohol resin softens readily with heat, making it, in many desired uses, too runny for certain operations, such as compounding it on mixing rolls. Where a more viscous condition is desired, a thickening agent may be added, which is compatible with the additional processing to be effected, and with the ultimate use. An excellent thickening agent is polyvinyl butyral. This is preferably present with the furfuryl alcohol before its condensation-polymerization, thus being more effective to its end, no doubt influencing the character of the lattice work formed by the condensation-polymerization. However, the use of polyvinyl butyral may be dispensed with without loss of the sulfur-setting effect of sulfur-setting agents upon condensation-polymerization product of furfuryl alcohol.

The condensation-polymerization reaction is subject to control to predetermine the viscosity of the condensation-polymerization product of furfuryl alcohol. One method is to predicate a standard, such as viscosity by the Stormer viscosimeter at 25° C. The viscosity may be measured in time units for 25 revolutions of the viscosimeter using a 1,000-gram weight. For particular uses such a viscosity of 60 to 90 seconds is preferred, but a larger range of such viscosities is permissible, at least as low as 50 seconds and at least as high as 145 seconds. The viscosity of the final sulfur-setting composition is determined in part and is largely affected by the viscosity of the condensation-polymerization product of furfuryl alcohol. Where the composition to be sulfur-set is applied by brushing, dipping or trowelling, it is to be expected that its viscosity becomes important from the consideration of methods of application. For other methods of application, the viscosity may be suitably such that it is outside of the limits which are controlling for brushing, dipping or trowelling.

The invention permits the provision of sulfur-setting compositions which have no volatile solvent to be evaporated. But where such a solvent is desired, it may readily be provided. Absence of such solvent is advantageous, since an applied thickness of sulfur-setting composition remains substantially unchanged after sulfur-setting. Where volatile solvent is lost in sulfur-setting, a shrinkage in thickness takes place, and to a degree some internal tension may be effected in the resulting coat. This possibility of tension is lessened when using a sulfur-setting composition lacking in volatile solvent.

Where no solvent is used, the viscous nature of the composition derives largely from the viscous nature of the furfuryl alcohol resin. This necessitates that the said resin be not a solid at the temperature at which it is desired that the sulfur-setting composition be viscous or plastic. But on the other hand, where a volatile solvent is used, the condensation-polymerization product of furfuryl alcohol may be either a non-solid or a solid, in either case to the extent that solution of it is suitably viscous to provide the desired viscosity in the sulfur-setting composition.

The sulfur-setting resin composition is preferably made by compounding the sulfur-setting agent with the condensation-polymerization product of furfuryl alcohol, but this is not a limitation. It may be made by compounding the sulfur-setting agent with furfuryl alcohol, so that the condensation-polymerization and the sulfur-setting are both effected in one heating operation, and perhaps simultaneously at least, in a part of the process. The results are generally of the same character in either case, as a consequence of which it is believed that condensation-polymerization is first effected, and that sulfur-setting provides atoms of sulfur as cross-links between different molecules of reaction products and possibly within single molecules in the case of some reaction products. As in rubber technology, the reaction is not one of critical combining proportions, and therefore, a wide range of ratio is permitted between sulfur or other sulfur-setting agent and the original quantity of furfuryl alcohol.

As in the vulcanization of rubber, an accelerator may be used, such as the dithiocarbamate type compounds used as accelerators in the vulcanization of rubber. It is a typical vulcanizing accelerator, of which others used for rubber are likewise suitable for use in the present invention, such as one which is zinc benzothiazyl sulfide plus 10% inert hydrocarbon.

Zinc oxide may be used as in the case for rubber, serving both as a pigment filler, and as a secondary sulfur-setting catalyst, again as it serves in vulcanizing rubber.

Carbon black is used in vulcanizable rubber compositions to limit flow in the mold during vulcanizing at elevated temperature. For the compositions of the present invention it acts likewise.

The polyvinyl butyral above referred to as a thickening agent is itself a resin, which functions primarily to render the condensation-polymerization product of furfuryl alcohol more viscous in the various possible stages of manipulation prior to sulfur-setting. It may also be subject to some reaction of sulfur-setting, but the results primarily desired in the ultimate coat prevail when polyvinyl butyral is not used. When it is used, 10 parts of it to 100 parts of furfuryl alcohol, suffice to give the desired thickening action. The same viscosity might be obtained by omitting the polyvinyl butyral and further advancing the condensation-polymerization, but tackiness will increase with the viscosity. The primary advantage of using the polyvinyl butyral is to secure the increased viscosity without said accompanying tackiness. Thus, a less variation of viscosity occurs with change in temperature.

In baking or molding the composition, the reaction is a function of both time and temperature, again as in vulcanizing rubber. Hence, neither time nor temperature alone is critical. Among the compositions given below, suitable applicable conditions are:

150° C. for 1½ hours
140° C. for 1½ hours
80° C. for 12 hours
150° C. for 1 hour
135° C. for 2 hours
100° C. for 1½ hours The following examples, in which parts are given by weight, illustrate the invention:

Composition A

|  | Parts |
|---|---|
| Furfuryl alcohol (pH of 6.2) | 100 |
| Polyvinyl butyral (Vinylite XYSG) | 10 |
| Boron fluoride | 0.0284 |
| Ethyl ether | 1.39 |

The boron fluoride is conveniently diluted with ethyl ether in a 2% solution by weight, and in heating the reaction mass containing such solution, the ether is substantially all lost before reaction begins. Such dilution of the boron fluoride may be dispensed with, especially in large batches, but for small masses in study of the problem, the dilution assures homogeneous distribution and avoids local action of condensation-polymerization.

The pH of the reaction mass influences its course for prescribed times and temperatures. Commercial furfuryl alcohol when freshly distilled has a pH of about 4.8. The pH gradually rises to about 6.2 when stored in steel drums. Using freshly distilled furfuryl alcohol permits use of less boron fluoride or other acid catalyst than shown in Composition A above.

The polyvinyl butyral is added to the furfuryl alcohol, and then the boron fluoride solution is added. The mass is heated.

The following is a typical time-temperature curve of the heating step:

| Minutes | Temperature, °C. | Remarks |
|---|---|---|
| 0 | 25 | Started heating. |
| 10 | 50 | |
| 15 | 60 | |
| 20 | 70 | |
| 25 | 80 | Reaction evident. |
| 30 | 86 | |
| 35 | 95 | |
| 40 | 100 | |
| 42 | 103 | |
| 45 | 102 | |
| 50 | 100 | |
| 55 | 102 | |
| 60 | 104 | |
| 65 | 100 | |
| 70 | 98 | Started cooling. |
| 75 | 85 | |
| 95 | 65 | |

The Stormer viscosity at 25° C. at 25 revolutions with a 1,000-gram weight, is 1 minute, 31 seconds.

Throughout this description parts and percents are given in terms of weights.

*Example 1*

| | Parts |
|---|---|
| Composition A | 80.65 |
| Sulfur | 6.05 |
| Zinc oxide | 8.06 |
| Carbon black | 3.22 |
| Dithiocarbamate type accelerator | 2.02 |

The above materials are compounded on rubber rolls or in a paint mill, or otherwise suitably mixed. When cured for one hour at 150° C. the cured product has been analyzed for sulfur which was determined as follows:

| | Per cent |
|---|---|
| Free sulfur | 2.55 |
| Combined sulfur | 5.55 |
| Total | 8.10 |

*Example 2*

| | Parts |
|---|---|
| Composition A | 47.50 |
| Sulfur | 3.56 |
| Zinc oxide | 4.75 |
| Carbon black (channel black) | 1.90 |
| Dithiocarbamate type accelerator | 1.19 |

The mixture applied to cold rolled steel and baked at 150° C. for one hour resisted boiling water for three months while exposed to air.

*Example 3*

| | Parts |
|---|---|
| Composition A | 100 |
| Sulfur | 2.5 |
| Zinc oxide | 5.0 |
| Said zinc benzothiazyl sulfide composition | 1.0 |

When cured at 135° C. for two hours, the above composition is highly resistant to boiling water while exposed to air.

*Example 4*

| | Parts |
|---|---|
| Composition A | 200 |
| Sulfur | 20 |
| Zinc oxide | 20 |
| Carbon black (channel black) | 5 |
| Dithiocarbamate type accelerator | 5 |

Cured at 140° C. for 1½ hours, the product is resistant to boiling water while exposed to air.

Referring to the curve data for Composition A, given above, it will be seen that reaction is slow and unsubstantial at below about 80° C. Therefore, any composition may be made for sulfur-setting by employing ingredients which lead to the formation of condensation-polymerization product of furfuryl alcohol along with the sulfurous agent to sulfur-set it, with or without auxiliary sulfur-setting agents such as accelerators and catalysts. Thus, there may be made a condensable-polymerizable sulfur-setting composition. An example follows:

*Example 5*

| | Parts |
|---|---|
| Furfuryl alcohol | 200 |
| Polyvinyl butyral | 20 |
| Sulfur | 22 |
| Zinc oxide | 22 |
| Carbon black (channel black) | 11 |
| Dithiocarbamate type accelerator | 5.5 |

When cured at 140° C. for 1½ hours, the product withstood boiling water for 22 days while exposed to air.

*Example 6*

| | Parts |
|---|---|
| Composition A | 200 |
| Sulfur | 20 |
| Zinc oxide | 20 |
| Carbon black (channel black) | 7 |
| Dithiocarbamate type accelerator | 5 |

When cured at 140° C. for 1½ hours, the product withstood boiling water for 22 days while exposed to air. It may be cured at 100° C. for 1½ hours, or at 80° C. for 12 hours.

Compositions which resist boiling water while exposed to air, for 12 to 15 days are considered highly satisfactory coating compositions.

In all of the examples above given, the Composition A may be changed to an equal weight of furfuryl alcohol, and the furfuryl alcohol may be changed to an equal weight of Composition A. Hence in the claims the substance of furfuryl alcohol is provided as material selected from the group consisting of furfuryl alcohol and condensation-polymers of furfuryl alcohol.

*Water vapor resistance*

The cured composition is an excellent resistor to the transmission of water vapor. A composition made by Example 1 is coated and cured onto a sheet of paper, as a film about 0.001 inch thick. The sheet was used over a dish of calcium chloride, edges being sealed with paraffin. At 70° F. and at an atmosphere outside the dish of 60% relative humidity, the transmission was measured over a period of time. The same kind of paper, uncoated, was tested in the same way. Results were transmissions as follows:

Coated paper: 10.6 grams water/sq. meter/24 hours

Uncoated paper: 1700 grams water/sq. meter/24 hours

The boiling water test is more severe when carried out in the presence of air. The sulphur-set products of the present invention are highly resistant to boiling water and to steam.

The composition is highly resistant also to hydrocarbons, such as gasoline and oil, and to salt water. It provides an excellent coating or lining for tanks and pipes for oil or gasoline as on ships for example, so that when salt water is used for ballast in the same tanks, the tank material is protected from the salt water, and later a refill of gasoline is protected from damage by iron which otherwise would have been corroded by the previous fill of salt water. Oil tankers frequently return from their ports of delivery without cargo, and then use salt water as ballast. It is customary to inspect oil tankers periodically. Before making such an inspection, the compartments of the tanker are steamed out at boiling temperature for removing the oil and gasoline fumes, in order that the inspectors may safely enter such compartments. The wall surfaces of the compartments of a tanker are thus subjected to the action of hydrocarbons, salt water and steam or boiling water in the order named. Tests have demonstrated that the composition of my invention is highly resistant to hydrocarbons, salt water and steam or boiling water applied thereto either in the order named or in any other order, and is, accordingly, eminently fitted for use as a protective coating in oil tankers and for analogous purposes. The composition adheres well to all metals, wood, paper, glass and many other materials. It protects stainless steel from pitting. Being resistant to boiling water, it is excellent for lining hot-water generating coils. Its use is not limited to coatings. Solid bodies may be molded from it, and compounds which at normal temperatures are dry and powdery may be made, subject to softening and flowing in a mold on sulfur-setting.

The scope of the invention as described and with its intended modifications, is set forth in the appended claims.

I claim:

1. The method of forming a thermosetting hot-moldable furan-derivative compound which comprises condensing and polymerizing furfuryl alcohol with an acidic catalyst and in the presence of a minor quantity of polyvinyl butyral, to form a viscous resinous mass of the acid condensation-polymerization product of furfuryl alcohol, and compounding a mixture predominating in said mass and containing sulfur as a sulfur-setting agent, and also zinc oxide and carbon black as filler and flow-control material for thermal sulfur-setting of the mixture in a mold.

2. The method of forming a furan-derivative resin which comprises condensing and polymerizing furfuryl alcohol with an acidic catalyst and in the presence of a minor quantity of polyvinyl butyral, to form a viscous resinous mass of the acid condensation-polymerization product of furfuryl alcohol, compounding a mixture predominating in said mass and containing sulfur as a sulfur-setting agent, and heating and curing said composition at a sulfur-setting temperature to a solid resin.

3. The method of forming a thermosetting hot-moldable furan-derivative compound which comprises condensing and polymerizing furfuryl alcohol with an acidic catalyst and in the presence of a minor quantity of polyvinyl butyral, to form a viscous resinous mass of the acid condensation-polymerization product of furfuryl alcohol, and compounding a mixture predominating in said mass and containing sulfur as a sulfur-setting agent.

4. The method of forming a furan-derivative resin which comprises condensing and polymerizing furfuryl alcohol with an acidic catalyst and in the presence of a minor quantity of polyvinyl butyral, to form a viscous resinous mass of the acid condensation-polymerization product of furfuryl alcohol, compounding a mixture predominating in said mass and containing sulfur as a sulfur-setting agent, coating said mixture onto a surface, and heating and curing the coat at a sulfur-setting temperature.

JOHN J. CLANCY.

REFERENCES CITED

The following references are of record in the file of this patent:

UNITED STATES PATENTS

| Number | Name | Date |
| --- | --- | --- |
| 1,665,235 | Trickey et al. | Apr. 10, 1928 |
| 2,174,886 | Keifer | Oct. 3, 1939 |
| 2,334,526 | Allison | Nov. 16, 1943 |
| 2,343,973 | Harvey | Mar. 14, 1944 |
| 2,366,049 | Payne et al. | Dec. 26, 1944 |
| 2,368,426 | Root et al. | Jan. 30, 1945 |

OTHER REFERENCES

India Rubber World, January 1941, vol. 103, pages 33 and 34.

Pages 182–185, Vanderbilt, 1942, Rubber Handbook, pub. 1942, by R. T. Vanderbilt Co., New York.